United States Patent
Seid et al.

(10) Patent No.: US 10,380,679 B2
(45) Date of Patent: Aug. 13, 2019

(54) VALUATION TOOL FOR AN ONLINE AUCTION OF A REAL PROPERTY ASSET

(71) Applicant: Auction.com, LLC, Irvine, CA (US)

(72) Inventors: Jacob Seid, Irvine, CA (US); Peter Muoio, Irvine, CA (US); Jennifer Leuer, Irvine, CA (US); John Hood, Irvine, CA (US); Nat Subsin, Irvine, CA (US)

(73) Assignee: Auction.com, LLC, Irvine, CA (US)

( * ) Notice: Subject to any disclaimer, the term of this patent is extended or adjusted under 35 U.S.C. 154(b) by 434 days.

(21) Appl. No.: 14/210,311

(22) Filed: Mar. 13, 2014

(65) Prior Publication Data

US 2014/0279151 A1    Sep. 18, 2014

Related U.S. Application Data

(60) Provisional application No. 61/801,386, filed on Mar. 15, 2013.

(51) Int. Cl.
G06Q 30/08 (2012.01)
G06Q 30/00 (2012.01)
G06Q 30/06 (2012.01)

(52) U.S. Cl.
CPC ............ *G06Q 30/08* (2013.01); *G06Q 30/00* (2013.01); *G06Q 30/06* (2013.01)

(58) Field of Classification Search
CPC ........ G06Q 30/00; G06Q 30/08; G06Q 40/00; G06Q 40/04; G06Q 30/06; G06Q 30/028; G06Q 50/16
USPC ............ 705/35, 37, 26.3, 26.1, 313, 400, 19
See application file for complete search history.

(56) References Cited

U.S. PATENT DOCUMENTS

| | | | |
|---|---|---|---|
| 5,845,265 A | 12/1998 | Woolston | |
| 5,857,174 A | 1/1999 | Dugan | |
| 6,058,379 A | 5/2000 | Odom et al. | |
| 6,085,176 A | 7/2000 | Woolston | |
| 6,813,612 B1* | 11/2004 | Rabenold | G06Q 40/04 705/1.1 |
| 6,947,906 B1* | 9/2005 | Underwood | G06Q 20/10 705/26.3 |

(Continued)

FOREIGN PATENT DOCUMENTS

| | | |
|---|---|---|
| AU | 2009100313 A4 | 5/2009 |
| WO | WO 2012/002229 | 5/2012 |

OTHER PUBLICATIONS

International Search Report and Written Opinion dated Jun. 3, 2014, Application No. PCT/US2014/019341, 11 Pages.

(Continued)

*Primary Examiner* — Olusegun Goyea
(74) *Attorney, Agent, or Firm* — Mahamedi IP Law LLP

(57) ABSTRACT

A computer-implemented method for generating an indicator of value relating to a real property asset is provided. The method includes providing a user interface that includes one or more prompts for soliciting information associated with the real property asset. Data associated with the real property asset is received. Based on the data associated with the real property asset, comparable data associated with one or more comparable assets is determined. An auction reserve price for the real property asset is generated based on the data associated with the real property asset and the comparable data.

9 Claims, 5 Drawing Sheets

(56) References Cited

U.S. PATENT DOCUMENTS

| | | | |
|---|---|---|---|
| 6,976,005 B1 | 12/2005 | Bansal et al. | |
| 7,213,000 B2* | 5/2007 | Gutierrez | G06Q 30/08 |
| | | | 705/26.3 |
| 7,225,151 B1 | 5/2007 | Konia | |
| 7,296,033 B1 | 11/2007 | Lynch | |
| 7,389,294 B2 | 6/2008 | Kotas | |
| 7,472,076 B2 | 12/2008 | Garg et al. | |
| 7,472,077 B2 | 12/2008 | Roseman | |
| 7,493,274 B2 | 2/2009 | Bezos | |
| 7,493,280 B2 | 2/2009 | Guler | |
| 7,497,369 B2 | 3/2009 | Dalzell | |
| 7,555,445 B2 | 6/2009 | Moya | |
| 7,613,633 B1 | 11/2009 | Woolston | |
| 7,617,145 B1* | 11/2009 | Peterson | G06Q 30/08 |
| | | | 705/35 |
| 7,653,575 B2 | 1/2010 | Lin | |
| 7,752,119 B2 | 7/2010 | Ghani | |
| 7,865,420 B1* | 1/2011 | Daman | G06Q 30/0621 |
| | | | 705/26.5 |
| 7,970,674 B2* | 6/2011 | Cheng | G06Q 10/10 |
| | | | 705/35 |
| 7,980,466 B2 | 7/2011 | Lee | |
| 8,103,540 B2 | 1/2012 | Gross | |
| 8,108,264 B1 | 1/2012 | Davis | |
| 8,234,180 B2 | 7/2012 | Danzan | |
| 8,386,330 B1 | 2/2013 | Kulavade et al. | |
| 8,560,479 B2 | 10/2013 | Bosworth | |
| 8,751,343 B2 | 6/2014 | Van Luchene | |
| 8,751,344 B2 | 6/2014 | Van Luchene | |
| 8,781,912 B2 | 7/2014 | Solari | |
| 2002/0082977 A1 | 6/2002 | Hammond et al. | |
| 2002/0087389 A1 | 7/2002 | Sklarz et al. | |
| 2002/0099643 A1* | 7/2002 | Abeshouse | G06Q 30/0641 |
| | | | 705/37 |
| 2002/0169705 A1 | 11/2002 | Gutierrez et al. | |
| 2003/0023538 A1* | 1/2003 | Das | G06Q 30/08 |
| | | | 705/37 |
| 2003/0229552 A1 | 12/2003 | Lebaric et al. | |
| 2004/0049440 A1 | 3/2004 | Shinoda et al. | |
| 2004/0128224 A1* | 7/2004 | Dabney | G06Q 30/08 |
| | | | 705/37 |
| 2005/0049960 A1* | 3/2005 | Yeager | G06Q 30/08 |
| | | | 705/37 |
| 2005/0108125 A1* | 5/2005 | Goodwin | G06Q 30/08 |
| | | | 705/35 |
| 2005/0154657 A1 | 7/2005 | Kim et al. | |
| 2005/0197950 A1 | 9/2005 | Moya et al. | |
| 2006/0136320 A1* | 6/2006 | Saberi | G06Q 30/08 |
| | | | 705/37 |
| 2006/0218070 A1 | 9/2006 | Lange | |
| 2007/0106593 A1* | 5/2007 | Lin | G06Q 40/04 |
| | | | 705/37 |
| 2007/0106596 A1 | 5/2007 | Bayyapu et al. | |
| 2007/0156758 A1 | 7/2007 | Adiga | |
| 2007/0203823 A1 | 8/2007 | Whelchel et al. | |
| 2007/0276745 A1 | 11/2007 | Harinarayan et al. | |
| 2008/0046353 A1* | 2/2008 | Poltorak | G06Q 40/00 |
| | | | 705/37 |
| 2008/0052219 A1 | 2/2008 | Sandholm | |
| 2008/0183596 A1* | 7/2008 | Nash | G06F 17/30979 |
| | | | 705/26.1 |
| 2008/0235113 A1* | 9/2008 | Rabenold | G06Q 30/0641 |
| | | | 705/26.3 |
| 2008/0235125 A1 | 9/2008 | Danzan | |
| 2008/0262943 A1 | 10/2008 | Mullendore | |
| 2008/0301064 A1 | 12/2008 | Burns | |
| 2009/0030833 A1* | 1/2009 | Leung | G06Q 30/08 |
| | | | 705/37 |
| 2009/0112726 A1 | 4/2009 | Miller et al. | |
| 2010/0057586 A1* | 3/2010 | Chow | G01S 19/14 |
| | | | 705/26.1 |
| 2010/0131426 A1* | 5/2010 | Kroutik | G06Q 30/00 |
| | | | 705/36 R |
| 2011/0173086 A1 | 7/2011 | Berkowitz | |
| 2012/0084169 A1 | 4/2012 | Adair et al. | |
| 2012/0136746 A1 | 5/2012 | Lange | |
| 2012/0239582 A1 | 9/2012 | Solari et al. | |
| 2012/0246024 A1 | 9/2012 | Thomas et al. | |
| 2013/0103532 A1 | 4/2013 | Emura | |
| 2013/0218708 A1 | 8/2013 | Finkelstein et al. | |

OTHER PUBLICATIONS

Anwar et al. "Bidding behavior in competing auctions: Evidence from eBay", European Economic Review, 307-322 (2006).

Notification Transmittal, International Search Report and Written Opinion dated Jun. 25, 2014, Application No. PCT/US2014/021733, 11 Pages.

Notification Transmittal, International Search Report and Written Opinion dated Jul. 15, 2014, Application No. PCT/US2014/026859, 9 Pages.

European Office Action, Communication Pursuant to Article 94(3) EPC, dated May 2, 2017 Application No. EP 14778060.5, 6 pages.

International Preliminary Report on Patentability dated Sep. 24, 2015, Application No. PCT/US2014/019341, 8 Pages.

International Preliminary Report on Patentability dated Sep. 24, 2015, Application No. PCT/US2014/026859, 7 Pages.

Extended European Search Report dated Jul. 13, 2016, Application No. EP 14778060.5.

Extended European Search Report dated Jul. 27, 2016, Application No. EP 14769795.7.

Rischpater, R. (2004). Ebay Application Development. Apress. 321 pages.

Examination Report dated Feb. 1, 2019, Application No. 2014236617 3 pages.

* cited by examiner

Asset Valuation

Please provide information about the asset

Address: ⬜ — 310

Type: [ Select Asset Type ▼ ] — 315

Sq Ft: ⬜   Year Built: ⬜ — 320

Lot Size: ⬜   Garage: ⬜ of Bed: ⬜   # of Bath: ⬜

Upload CMA: [ Browse ] — 325

[ Submit ] — 330

FIG. 3A

VALUATION TOOL FOR AN ONLINE AUCTION OF A REAL PROPERTY ASSET

RELATED APPLICATIONS

This application claims benefit of priority to Provisional U.S. Patent Application No. 61/801,386, filed Mar. 15, 2013, titled VALUATION TOOL FOR AN ONLINE AUCTION OF A REAL PROPERTY ASSET; the aforementioned application is hereby incorporated by reference in its entirety.

TECHNICAL FIELD

Examples described herein pertain generally to a system and method for valuating a real property asset in an online auction environment.

BACKGROUND

Online auctions provide an effective way to sell assets. In certain circumstances, such as for real property sales, setting reserve prices for the auctions may pose challenges.

BRIEF DESCRIPTION OF THE DRAWINGS

FIG. 3A illustrates an example user interface that includes prompts to solicit asset information.

DETAILED DESCRIPTION

Figure 1:
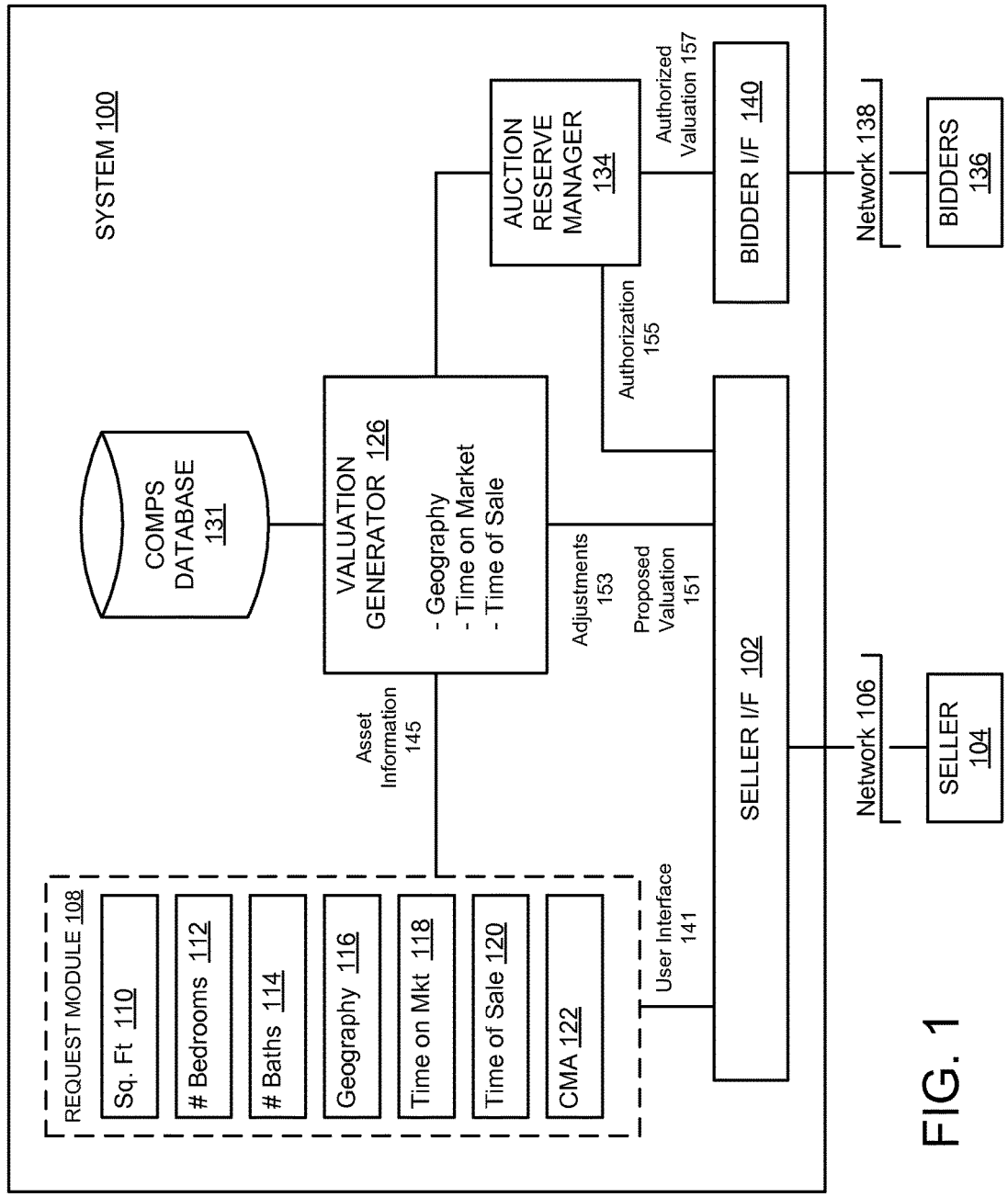
FIG. 1 illustrates an example system for valuating a real property asset via an online auction platform.

Examples described herein provide a system and computer-implemented method for generating reserve valuations for real property assets in an online auction environment. For example, in an online auction environment, a seller of an asset may want to designate an appropriate reserve valuation to protect the seller from having to sell the asset at a price that the seller deems too low. For real property, the valuation of an asset can vary depending on numerous factors. Examples described can provide a mechanism that provides an approximate valuation for a seller's asset based on information provided by the seller and that enables the seller to make adjustments to data used to determine the valuation. The seller can confirm the valuation for purposes of setting a reserve valuation for the asset.

According to an example, a computer-implemented method for generating an indicator of value relating to a real property asset is provided. The method includes providing a seller interface for network communication with a seller, and prompting the seller for information associated with the real property asset. Geographical and market information associated with the asset is extracted. An auction reserve price may then be proposed to the seller based on the extracted geographical information and the extracted market information.

In one example, a user interface can be provided to a computing device operated by a seller of an asset. The user interface can be displayed as part of an application running on the computing device of the seller or displayed as part of a web page that can be displayed via a browser. The user interface can provide a plurality of prompts that solicits or requests information about the asset the seller is proposing to sell. The seller can interact with the user interface in order provide valuation-specific criteria. A valuation system can extract information relevant to determine valuation from the information provided by the seller and generate a proposed reserve valuation based on the extracted information.

According to some examples, the valuation system can generate a valuation of the asset that is tailored to the specific characteristics of that asset. Another user interface can be displayed to the seller of the asset that communicates the proposed (and generated) reserve valuation to the seller. The user interface can include display components that were used to calculate the reserve price. The user interface can enable the seller to adjust the proposed reserve valuation by adjusting one or more of the components used to generate the valuation. The valuation system can recalculate the reserve value based on changes, if any, to the components made by the seller.

As used herein, an "asset" may refer to an interest in real property, such as residential or commercial real estate. Also as used herein, a "seller" may refer to an individual or entity that is putting up the asset for auction. While examples described herein refer to a seller of an asset, other users, such as an asset evaluator, a real estate agent, a home inspector, an appraiser, etc., can interact with the valuation system for determining a proposed valuation for an asset.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component may include a program, a sub-routine, a portion of a program, or a software component or a hardware component capable of performing one or more stated tasks or functions. As used herein, a module or component may exist on a hardware component independently of other modules or components. Alternatively, a module or component may be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipments (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples of the invention can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an embodiment of an example valuation system that generates a proposed price (e.g., an estimated valuation or a reserve valuation) of an asset for sale on an online real property auction. The valuation system can provide prompts that guide a seller of an asset to input information that is pertinent to determining a valuation for the asset, and can generate the valuation based on the information provided by the seller. Such a valuation can correspond to a reserve valuation or an estimated valuation of the asset. As referred to herein, a reserve valuation corresponds to the lowest amount that the seller is willing to sell the asset for (e.g., a minimum sale price) during the process of the auction. In examples described, the reserve valuation can be configured by the seller in order protect the seller from having to sell the asset at a price that is too low during the online auction. The valuation system may also interface with or be a part of an auction system that handles at least some or all of the related aspects to the online auction process.

According to an embodiment, system 100 includes a request module 108, a valuation generator 126, comparable assets database 131, and an auction reserve manager 134. The components of system 100 can combine to provide prompts instructing a seller of an asset to provide relevant information about the asset, receive a plurality of information about the asset, and generate a valuation for the asset based on at least some of the information received. Logic can be implemented with various applications (e.g., software) and/or with hardware of a computer system that implements system 100. For example, system 100 can be implemented through software that operates on various computing platforms, such as a general-purpose computer, a web-based server, and/or a mobile computing device, and/or on network side resources, such as on one or more servers. System 100 can also be implemented through other computer systems in alternative architectures (e.g., peer-to-peer networks, etc.).

System 100 can also include a seller interface 102 and a bidder interface 140 that enables components of system 100 to exchange information with seller devices 104 and bidder devices 136, respectively, over one or more networks 106, 138. The seller and bidder interfaces 102, 140 can each manage communications between system 100 and the respective computing devices 104, 136. In some examples, the seller devices 104 and the bidder devices 136 can individually operate a browser application to access web page(s) pertaining to an online auction provided by system 100 or operate a designated application provided by system 100.

In an online real property auction environment, determining an appropriate reserve price for a seller may be subject to a host of variables that are difficult to quantify. System 100 can provide a mechanism that determines a valuation for an asset based on data pertaining to the asset and/or data associated with other similar assets. In one example, a seller of an asset can operate a seller device 104 to communicate with system 100 and/or an online auction system for purposes of setting up the asset for sale. The seller, for example, can access a web page corresponding to the online auction system using a browser application on the seller device 104. The request module 108 can provide one or more user interfaces 141 to the seller device 104 through a network connection 106 via the seller interface 102 in order to receive information about the asset for sale from the seller. For example, the request module 108 solicits data from the seller in the form of prompts that are provided with the one or more user interfaces 141.

In some examples, the prompts are configured in a manner that facilitates grouping similar content or information together such that certain valuation-specific criteria may be evaluated. The information solicited from the seller pertains generally to characteristics of the asset being put up for auction by the seller, and may include, for example, basic asset data, such as the asset square footage 110, number of bedrooms 112, number of bathrooms 114, the geographical location of the asset 116 (e.g., zip code, address, etc.), the time that the asset has been on the market 118 (e.g., how long the asset has been available for sale), and the time of sale interval 120. The request module 108 can also solicit a comparative market analysis (CMA) 122 from the seller. The CMA is a report that shows active listings, pending listings, sold listings, withdrawn or canceled listing, etc., for real estate properties. The CMA can be used by the valuation generator 126, for example, to determine the valuation for the asset.

The seller can interact with the user interface 141 in order to provide information that corresponds to the prompts and that is specific to the asset for sale. The request module 108 can receive the information, associate the received information with the asset for sale (e.g., with an identifier for the asset) and the seller (e.g., with an identifier of the seller), and store the information in an asset database (not shown in FIG. 1). In one example, the data provided to the request module 108 (e.g., the asset information 145 pertaining to the asset of sale) can be forwarded to a valuation generator 126. In other examples, the valuation generator 126 can retrieve the data corresponding to the asset from the asset database for purposes of determining a valuation for the asset.

According to some examples, the valuation generator 126 organizes and sorts the data so that the features associated with the asset may be compared to similar features for similar assets that were recently sold (comparable assets or "comps"). Comparable data corresponding to comparable assets may be extracted from a source of comparable asset information, such as from a publicly available site, from an internally maintained comps database 131, and/or from a CMA that is provided by the seller via the request module 108. The comps database 131 can include a plurality of entries corresponding to a plurality of comparable assets, with each entry having data corresponding to that asset. For example, a comparable asset can be an asset that has been recently sold or has been offered for sale by other sellers. Information about the comparable asset can be stored in the comps database 131, including the price at which the comparable asset was sold or offered for sale, as well as the basic asset data, such as types of data similar to the data received by the request module 108 pertaining to the asset for sale by the seller.

The valuation generator 126 can use information from the received asset information 145 in order to determine a valuation for the asset. In one example, the valuation generator 126 can use the geography information and the market information about the asset to determine comparable assets from the comps database 131. The valuation generator 126 can (i) compare the geography information and the market information (as well as other asset information 145, such as the number of bedrooms, the square footage, etc.) with information stored in the entries corresponding to comparable assets, (ii) determine which asset(s) are similar to the characteristics of the asset for sale, and (iii) determine a price or valuation of those comparable asset(s) as well as other information about the comparable asset(s).

Based on the data associated with the asset and the comparable data, the valuation generator 126 can generate a proposed valuation 151 for the asset. The proposed valuation 151 can be representative of an estimated reserve price for the asset or an estimated sale price in general. For example, a given geography of an asset as it relates to time on the market may be a factor that isn't reflected in market comparables. Thus, in an embodiment, the valuation generator 126 extracts geographical information associated with the asset, and correlates it with a time factor for which comparable assets in that geography typically spend on the market. A discount or enhancement weighting may then be applied to market comp information to more accurately valuate the asset in terms of an appropriate reserve price for the seller.

Once the proposed valuation 151 is generated, the valuation generator 126 can communicate the proposed valuation 151 to the seller device 104 via the seller interface 102. In one example, the proposed valuation 151 can be provided as part of a pricing user interface that can be displayed on a display of the seller device 104. In addition, the valuation generator 126 can also display or otherwise inform the seller of the factors or components that went into generating the proposed valuation 151. In this manner, the valuation process can be made transparent to the seller and provide the seller with guidance for configuring the reserve price for the asset.

According to some examples, the valuation generator 126 can provide a pricing user interface to the seller device 104 that includes the proposed valuation 151 (e.g., the auction reserve price) for the asset, information about factors or components that were used by system 100 to generate the auction reserve price, and a prompt informing the seller that the auction reserve price can be changed by adjusting one or more factors or components. The seller can interact with the user interface to provide data corresponding to adjustments 153 of the factor(s) or component(s) that were used to determine the proposed valuation 151. The valuation generator 126 can receive, from the seller device 104, data indicative of the adjustments 153, and based on the adjustments 153, generate or re-calculate a modified reserve price. In this manner, the pricing user interface provides a means for the seller to respond to certain prompts by system 100 concerning the accuracy of the evaluated components to adjust the proposed valuation 151.

For example, if a given market comparable asset was a four bedroom single family house, and the seller knew that one of the bedrooms of his or her asset was unpermitted or was not a full bedroom, the seller may provide input on the pricing user interface by noting that the comparable assets should only have 3 bedrooms. The adjusted component (e.g., bedroom number) can cause the valuation generator 126 to re-calculate a more accurate valuation for the asset. Similar adjustments 153 to square footage, remodeled rooms, and so forth, may also be made. When the adjustments 153 are provided to the valuation generator 126, the valuation generator 126 can generate the modified reserve price. Again, the valuation generator 126 can then provide the modified reserve price to the seller via a user interface along with the factors used to determine the modified reserve price. The seller can continue to provide adjustments 153 until the seller confirms or authorizes the valuation.

In one example, the valuation generator 126 can also provide the proposed valuation 151 and/or the modified valuation to the auction reserve manager 134. The auction reserve manager 134 can interface or communicate with the online auction system in order to update the online auction for the asset with the appropriate valuation. The auction reserve manager 134 can determine when the seller of the asset provides an authorization 155 that configures or sets the reserve valuation for the asset. In this manner, when a finalized reserve price is authorized by the seller, the auction reserve manager 134 updates the online auction with the reserve price and provides the reserve price (e.g., the authorized valuation 157) to the online auction system (e.g., makes the authorized valuation 157 available to the bidders of the online auction environment).

Bidders operating bidder computing devices 136 may then be able to access the online auction via the bidder interface 140 over one or more networks 138. The auction for the asset can be implemented with the authorized valuation 157, so that the asset is sold only when the authorized valuation 157 is reached during the auction. In this manner, the seller of the asset can be protected from selling the asset at a price that is too low.

Among other benefits, examples described herein achieve a technical effect by providing enhanced user interfaces to computing devices for enabling a seller to configure a reserve valuation of an asset for purposes of an online auction sale. Further, the valuation system can determine the reserve valuation based on asset-specific data and data collected about comparable assets, thereby resulting in a technical effect in which a proper approximate value can be generated for the seller as an outward manifestation of the processed data. In addition, the valuation system can dynamically adjust the mechanism used to determine the reserve valuation based on inputs provided by the seller.

Methodology

Figure 2:
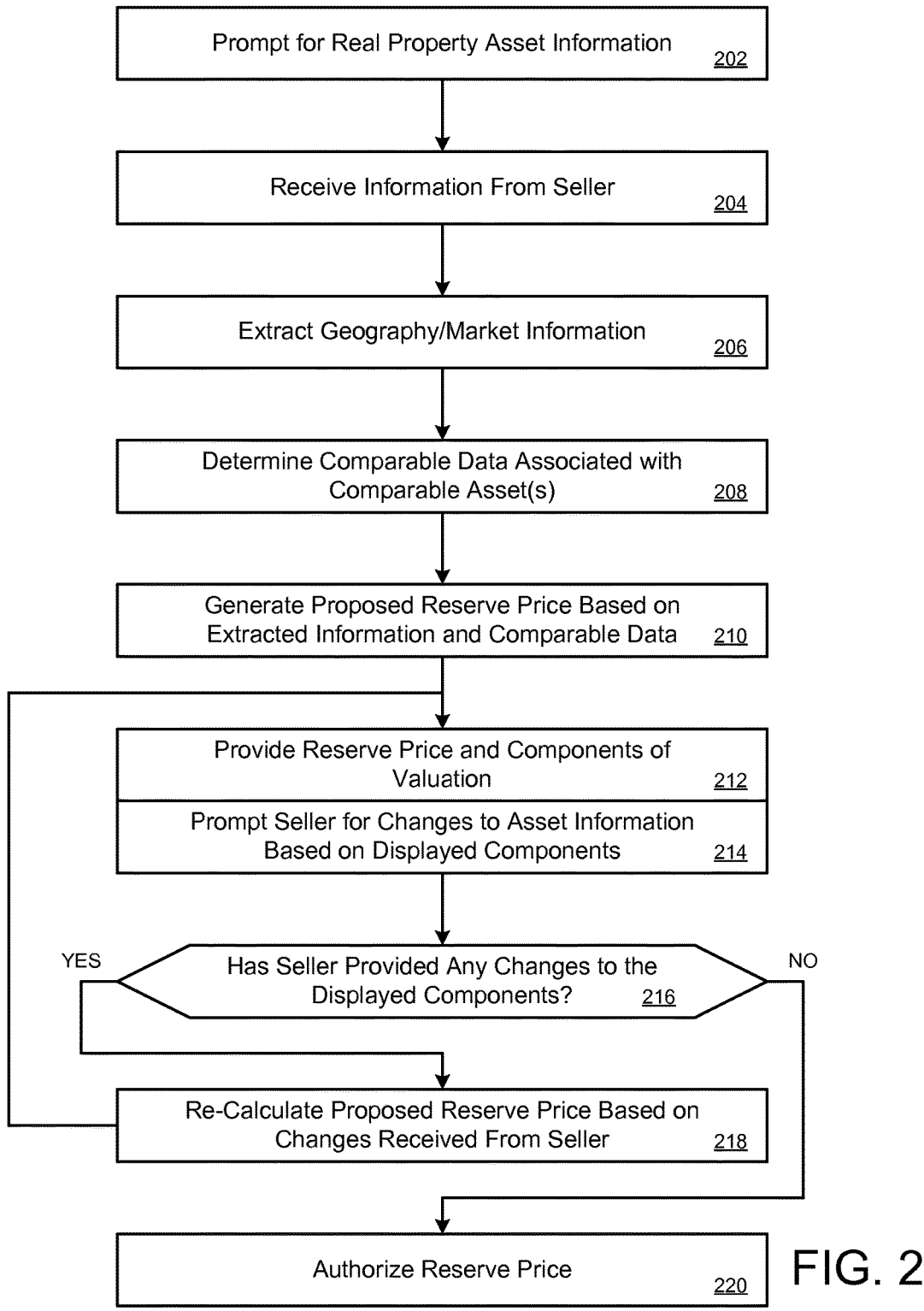
FIG. 2 illustrates an example method for valuating a real property asset via an online auction platform.

FIG. 2 illustrates an example method for generating a real property online auction reserve price. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

Referring to FIG. 2, a valuation system 100 can provide a user interface to prompt a seller of a real property asset for information pertaining to the asset (202). In some examples, the seller is prompted to enter a variety of inputs that are indicative of valuation criteria that are associated with the asset. The prompts enable the seller of the asset to provide basic factual data regarding the real property asset in a manner suitable for a valuation determination. Basic factual data can include, for example, the square footage of the asset, the number of bedrooms, the number of bathrooms, lot size, garage size, how many floors the asset is, the year the asset was built, whether any upgrades have been done to the asset, etc. Geographical information relating to the asset may also be provided, such as a zip code, proximity to a city center, water, and the like.

The request module 108 of system 100 can receive the information from the seller based on inputs provided by the seller on the seller device (204). Once the asset information is provided by the seller, the valuation generator 126 can begin an evaluation of market price. In one embodiment, the valuation generator 126 can extract the geographic information relating to the asset and/or the relevant market information of the asset for purposes of determining a valuation (e.g., a reserve price) for that asset (206). The geographic information can pertain to the location of the asset, such as the street, the neighborhood, the town or city, the county, the state, etc., while the market information may correspond to information about the sale of the asset, such as the time on the market.

The valuation generator 126 can also determine, based on the asset information received from the seller device, comparable data associated with one or more comparable asset(s) (208). According to some examples, one or more comparable assets that is similar to the asset for sale may be determined by comparing the characteristics of the asset with the characteristics of the comparable asset entries stored in a database. For example, a comparable asset can be located in a similar geography (e.g., within a predefined distance, or within the same city limits or county, etc.) of the asset for sale, can have a similar size (e.g., have a square footage or lot size that is within a predefined percentage or range) of the asset for sale, can have the same number of bedrooms and/or bathrooms, can have similar market information as the asset for sale, etc. A valuation of the comparable asset (e.g., the selling price, the listing price, the reserve price, etc.) can also be determined by the valuation generator 126.

The valuation generator 126 can generate a proposed reserve price or valuation based on the asset information (e.g., geography, market information, basic asset facts, etc.) and the comparable data of one or more comparable assets (210). The valuation generator 126 can provide, to the seller device, the proposed valuation as part of a user interface. In addition, to enable the seller to adjust (e.g., augment or lower) the proposed reserve price, the components or factors that were used by system 100 to generate the valuation can also be displayed to the seller, e.g., as part of the pricing user interface (212). The pricing user interface can also instruct the seller that the seller can modify one or more components of the valuation in order to adjust the proposed valuation (214). For example, the seller can modify a component to notify system 100 how one or more of the components are inaccurate and/or should otherwise not be used in the valuation process. System 100 can determine whether the seller has provided any changes to the one or more components of the valuation, e.g., determine if the seller wants to change the proposed reserve price (216).

If the seller provides changes to the component(s) for valuation, the valuation generator 126 can re-calculate a modified reserve valuation based on the changes to the components (218). Once the reserve price is re-calculated, the reserve price and/or the components for the valuation can then again be provided to the seller. The process can continue until the seller is satisfied with the proposed reserve price (e.g., until the seller confirms the proposed reserve price). On the other hand, when no changes are requested to be made to the proposed reserve price, the seller can provide an authorization confirming the proposed reserve price (220).

As an example, a component for the proposed valuation can include a type of real property, such as a townhouse. The valuation system may have used comparable data of a comparable asset that is a townhouse having three floors when making the proposed valuation. The seller may wish to change or disqualify a townhouse if her real property is a single family home instead of a townhouse, for example, and having only two stories. The seller can adjust the component(s) in order to have the valuation system re-calculate the proposed valuation.

When the reserve price is authorized by the seller, the auction reserve manager 134 can update the online auction with the finalized reserve price and provide the finalized reserve price to the online auction system. In this manner, system 100 enables the seller to view the components that are used for making the valuation and to provide reasons or information that re-weights or disqualifies certain components from being used for the valuation.

While many of the embodiments described above have been presented in an auction context, alternatives to the embodiments described above may be utilized in non-auction environments.

User Interface Examples

FIG. 3A illustrates an example user interface that includes prompts to solicit asset information. The user interface of FIG. 3A can correspond to a user interface that is provided to and displayed by a computing device operated by a seller, as described in FIGS. 1 and 2. In one example, a user interface 300 provides a prompt instructing the seller to provide a variety of information for purposes of determining a reserve price for an asset to be auctioned on an online auction environment.

Depending on implementation, a plurality of input fields and/or selectable features can be provided with the user interface 300 that pertain to characteristics about the asset. For example, an input field 310 can correspond to geographic information about the asset, such as the location of the asset (e.g., the address, the county, the state, etc.) The user interface 300 can also include a selectable feature 315 that the seller can select to choose the type of real property of the asset (e.g., a drop-down menu having a plurality of options), and other input fields or features 320, such as the square footage of the asset, the year the asset was built, the lot size, the number of cars that can fit in the garage, the number of bedrooms, the number of bathrooms, etc. Other information, such the time the asset was placed for sale (e.g., time on the market), can also be displayed on the user interface 300.

In some examples, the user interface 300 can also enable the seller to upload or provide a comparative market analysis (CMA) 325. The CMA is a report that shows active listings, pending listings, sold listings, withdrawn or canceled listing, etc., for real estate properties. The CMA, along with the asset information, can be used by the valuation system to determine the valuation of the asset. Once the seller inputs the relevant asset information, the seller can submit the information to the valuation system (e.g., select the feature 330).

Figure 3B:
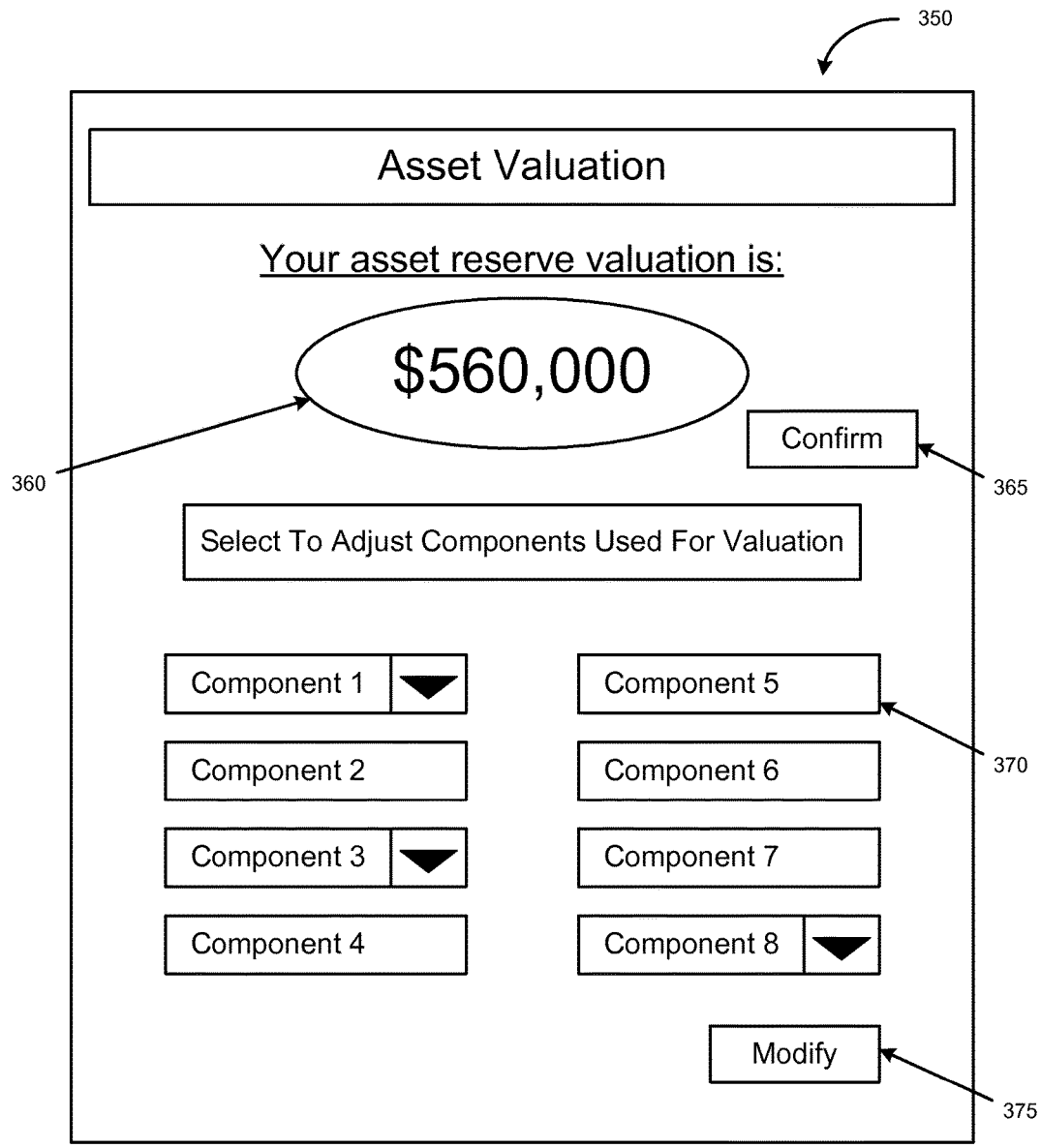
FIG. 3B illustrates an example user interface for displaying a reserve price and valuation information.

FIG. 3B illustrates an example user interface for displaying a reserve price and valuation information. The user interface of FIG. 3B can correspond to a pricing user interface that is provided to and displayed by a computing device operated by a seller, as described in FIGS. 1 and 2. According to an example, a user interface 350 can be provided to the seller device after the valuation system generates a proposed valuation for the asset based on asset information provided by the seller and based on comparable data of comparable assets that are similar to the asset.

The user interface 350 can display a proposed valuation 360 of the asset that is generated by the valuation system. In addition, the user interface 350 can include a feature 365 that enables the seller to confirm the proposed valuation 360. If the seller determines that the proposed valuation 360 is a fair reserve price for the auction, for example, the seller can select the feature 365 and authorize the proposed valuation 360. The valuation system can communicate with the online auction system with the finalized reserve price.

On the other hand, if the seller wants to adjust the proposed valuation 360, the seller can select and modify one or more components or factors that were used by the valuation system to generate the proposed valuation 360. The user interface 350 can display a plurality of features 370 informing the seller of the components or factors that were used in order to calculate the proposed valuation 360. In the example shown in FIG. 3B, for illustrative purposes, the components are indicated as Components 1-8. The seller can interact with one or more of the displayed features 370 to adjust the proposed valuation 360 (e.g., make adjustments to square footage, type of real estate, remodeled rooms, number of bedrooms, etc.). In this manner, when the seller makes adjustments to one or more components and requests modification of the proposed valuation 360 (e.g., selects the feature 375), the valuation system can re-calculate the proposed valuation and provide the re-calculated valuation to the seller via the user interface 350 (or display another user interface to the seller device).

Hardware Diagram

Figure 4:
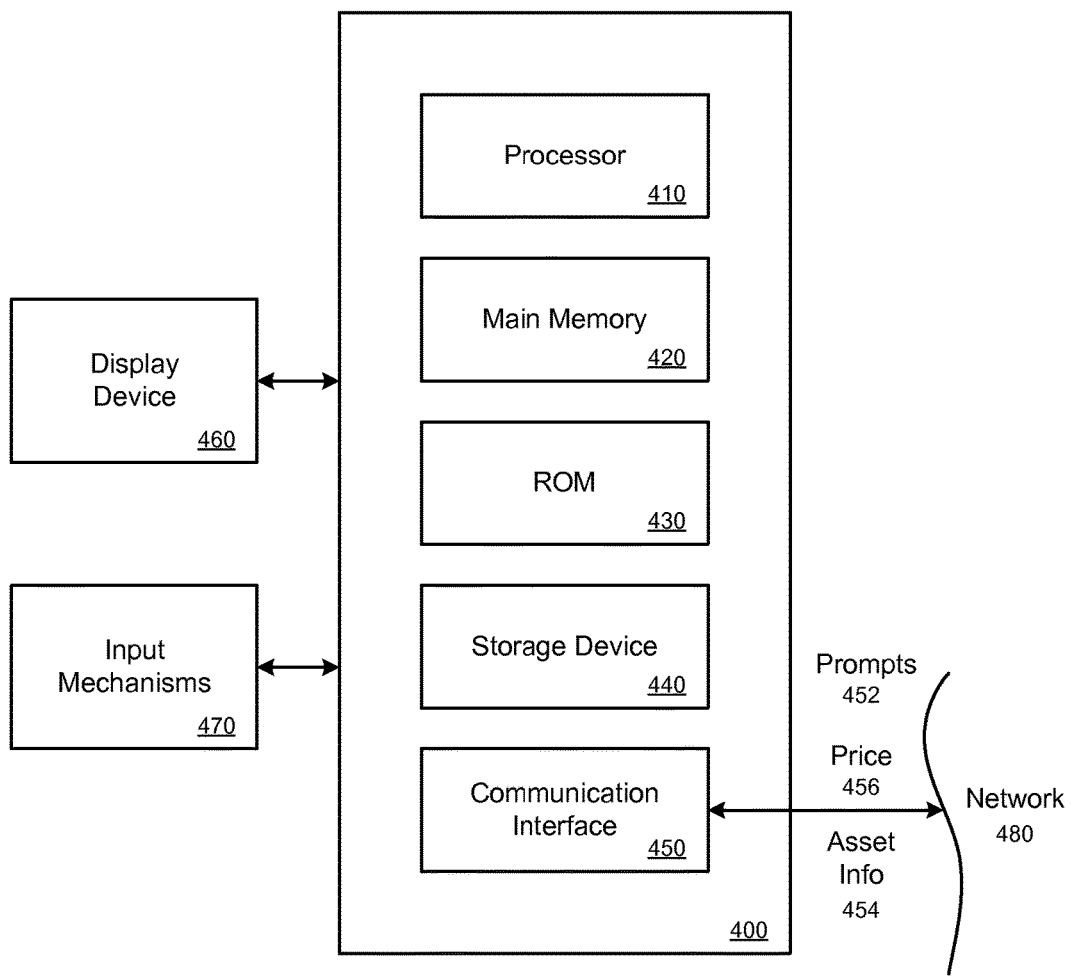
FIG. 4 is a block diagram that illustrates a computer system upon which examples described herein may be implemented.

FIG. 4 is a block diagram that illustrates a computer system upon which examples described herein may be implemented. For example, in the context of FIG. 1, system 100 may be implemented using a computer system such as described by FIG. 4. System 100 may also be implemented using a combination of multiple computer systems as described by FIG. 4.

In one implementation, computer system 400 includes processing resources 410, main memory 420, ROM 430, storage device 440, and communication interface 450. Computer system 400 includes at least one processor 410 for processing information. Computer system 400 also includes a main memory 420, such as a random access memory (RAM) or other dynamic storage device, for storing information and instructions to be executed by the processor 410. Main memory 420 also may be used for storing temporary variables or other intermediate information during execution of instructions to be executed by processor 410. Computer system 400 may also include a read only memory (ROM) 430 or other static storage device for storing static information and instructions for processor 410. A storage device 440, such as a magnetic disk or optical disk, is provided for storing information and instructions.

The communication interface 450 can enable the computer system 400 to communicate with one or more networks 480 (e.g., cellular network) through use of the network link (wireless or wireline). Using the network link, computer system 400 can communicate with one or more computing devices and/or one or more servers. For example, computer system 400 can (i) provide prompts 452 (e.g., as part of a user interface) to a computing device operated by a seller to solicit information about an asset from a seller for purposes of determining valuation, (ii) receive asset information 454 from the computing device operated by the seller, and/or (iii) provide a valuation 456 generated for the asset based on the asset information 454, via the network link. The received asset information 454 can also be used by the processor 410 to generate the valuation 456 and can be stored in, for example, the storage device 440.

Computer system 400 can also include a display device 460, such as a cathode ray tube (CRT), an LCD monitor, or a television set, for example, for displaying graphics and information to a user. An input mechanism 470, such as a keyboard that includes alphanumeric keys and other keys, can be coupled to computer system 400 for communicating information and command selections to processor 410. Other non-limiting, illustrative examples of input mechanisms 470 include a mouse, a trackball, touch-sensitive screen, or cursor direction keys for communicating direction information and command selections to processor 410 and for controlling cursor movement on display 460.

Examples described herein are related to the use of computer system 400 for implementing the techniques described herein. According to one example, those techniques are performed by computer system 400 in response to processor 410 executing one or more sequences of one or more instructions contained in main memory 420. Such instructions may be read into main memory 420 from another machine-readable medium, such as storage device 440. Execution of the sequences of instructions contained in main memory 420 causes processor 410 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer-implemented method for providing a user interface for managing an online auction for a real property asset, the method being implemented by a network system and comprising:

providing, to a computing device of a seller of the real property asset, the user interface that includes one or more prompts for soliciting information associated with the real property asset;

receiving, via the user interface from the computing device of the seller, data associated with the real property asset;

based on the received data associated with the real property asset, accessing a database connectively coupled with the network system to extract geographic information regarding the real property asset and to identify one or more comparable assets to the real property asset;

determining a set of time factors for the one or more comparable assets, each of the set of time factors indicating a respective duration a corresponding one of the one or more comparable assets is listed for sale;

generating, based on a plurality of estimation components, an auction reserve suggestion for the real property asset, the plurality of estimation components being determined based on the received data associated with the real property asset, the extracted geographic information, the one or more comparable assets, and the set of time factors;

causing the user interface to be updated on the computing device to display the auction reserve suggestion, the plurality of estimation components, and one or more user interface features to receive user input to modify the one or more of the plurality of estimation components;

in response to receiving, via the user interface, user input to modify one or more of the plurality of estimation components, generating an updated auction reserve suggestion and causing the user interface to be further updated on the computing device to display the updated auction reserve suggestion; and in response to receiving, via the user interface, user authorization of the updated auction reserve suggestion, updating a reserve price associated with the online auction for the real property asset to the updated auction reserve suggestion such that the real property asset is deemed as sold for the online auction only when the updated reserve price is reached during the online auction.

2. The method of claim 1, further comprising causing the user interface to be updated on the computing device to display a prompt informing the seller that one or more of the plurality of estimation components can be adjusted to change the auction reserve suggestion.

3. The method of claim 1, wherein the received data associated with the real property asset includes information corresponding to a square footage, information corresponding to a number of bedrooms, information corresponding to a number of bathrooms, geography information, and an amount of time the real property asset has been available for sale.

4. The method of claim 1, further comprising determining a set of comparable data by comparing the received data associated with the real property asset with information associated with the one or more comparable assets that are stored in the database.

5. A non-transitory computer-readable medium storing instructions that, when executed by a processor of a server, cause the server to perform operations comprising:

providing, to a computing device of a seller of a real property asset for sale via an online auction, a user interface that includes one or more prompts for soliciting information associated with the real property asset;

receiving, via the user interface from the computing device of the seller, data associated with the real property asset;

based on the received data associated with the real property asset, accessing a database connectively coupled with the server to extract geographic information regarding the real property asset and to identify one or more comparable assets to the real property asset;

determining a set of time factors for the one or more comparable assets, each of the set of time factors indicating a respective duration a corresponding one of the one or more comparable assets is listed for sale;

generating, based on a plurality of estimation components, an auction reserve suggestion for the real property asset based on the received data associated with the real property asset, the extracted geographic information, the one or more comparable assets, and the set of time factors;

causing the user interface to be updated on the computing device to display the auction reserve suggestion, the plurality of estimation components, and one or more user interface features to receive user input to modify the one or more of the plurality of estimation components;

in response to receiving, via the user interface, user input to modify one or more of the plurality of estimation components, generating an updated auction reserve suggestion and causing the user interface to be further updated on the computing device to display the updated auction reserve suggestion; and in response to receiving, via the user interface, user authorization of the updated auction reserve suggestion, updating a reserve price associated with the online auction for the real property asset to the updated auction reserve suggestion such that the real property asset is deemed as sold for the online auction only when the updated reserve price is reached during the online auction.

6. The non-transitory computer-readable medium of claim 5, wherein the instructions cause the server to further perform operations comprising:

causing the user interface to be updated on the computing device to display a prompt informing the seller that one or more of the plurality of estimation components can be adjusted to change the auction reserve suggestion.

7. The non-transitory computer-readable medium of claim 5, wherein the received data associated with the real property asset includes information corresponding to a square footage, information corresponding to a number of bedrooms, information corresponding to a number of bathrooms, geography information, and an amount of time the real property asset has been available for sale.

8. The non-transitory computer-readable medium of claim 6, wherein the instructions cause the server to determine a set of comparable data by comparing the received data associated with the real property asset with information associated with comparable assets that are stored in a database.

9. A network system comprising:
a network interface;
one or more processors; and
one or more memory resources storing instructions that, when executed by the one or more processors of a network system, cause the network system to perform operations comprising:

providing, to a computing device of a seller of a real property asset for sale via an online auction, a user interface that includes one or more prompts for soliciting information associated with the real property asset;

receiving, via the user interface from the computing device of the seller, data associated with the real property asset;

based on the received data associated with the real property asset, accessing a database connectively coupled with the network system to extract geographic information regarding the real property asset and to identify one or more comparable assets to the real property asset;

determining a set of time factors for the one or more comparable assets, each of the set of time factors indicating a respective duration a corresponding one of the one or more comparable assets is listed for sale;

generating, based on a plurality of estimation components, an auction reserve suggestion for the real property asset, the plurality of estimation components being determined based on the received data associated with the real property asset, the extracted geographic information, the one or more comparable assets, and the set of time factors;

causing the user interface to be updated on the computing device to display the auction reserve suggestion, the plurality of estimation components, and one or more user interface features to receive user input to modify the one or more of the plurality of estimation components;

in response to receiving, via the user interface, user input to modify one or more of the plurality of estimation components, generating an updated auction reserve suggestion and causing the user interface to be further updated on the computing device to display the updated auction reserve suggestion; and in response to receiving, via the user interface, user authorization of the updated auction reserve suggestion, updating a reserve price associated with the online auction for the real property asset to the updated auction reserve suggestion such that the real property asset is deemed as sold for the online auction only when the updated reserve price is reached during the online auction.

* * * * *